United States Patent
Joensen et al.

(10) Patent No.: US 8,598,238 B2
(45) Date of Patent: *Dec. 3, 2013

(54) PROCESS FOR THE PREPARATION OF HYDROCARBONS FROM SYNTHESIS GAS

(75) Inventors: Finn Joensen, Hørsholm (DK); Poul Erik Højlund Nielsen, Fredensborg (DK); Esben Lauge Sørensen, Hillerød (DK)

(73) Assignee: Haldor Topsoe A/S, Lyngby (DK)

( * ) Notice: Subject to any disclaimer, the term of this patent is extended or adjusted under 35 U.S.C. 154(b) by 62 days.

This patent is subject to a terminal disclaimer.

(21) Appl. No.: 13/376,545

(22) PCT Filed: Jun. 3, 2010

(86) PCT No.: PCT/EP2010/003368
§ 371 (c)(1),
(2), (4) Date: Dec. 6, 2011

(87) PCT Pub. No.: WO2010/149263
PCT Pub. Date: Dec. 29, 2010

(65) Prior Publication Data
US 2012/0078023 A1 Mar. 29, 2012

(30) Foreign Application Priority Data

Jun. 26, 2009 (DK) .................. 2009 00798

(51) Int. Cl.
*C07C 27/00* (2006.01)
(52) U.S. Cl.
USPC .......................................... 518/705; 518/700
(58) Field of Classification Search
USPC ................................. 518/700, 705
See application file for complete search history.

(56) References Cited

U.S. PATENT DOCUMENTS

| 4,481,305 A | 11/1984 | Jorn et al. |
| 4,520,216 A | 5/1985 | Skov et al. |
| 5,177,114 A | 1/1993 | Van Dijk et al. |
| 2011/0314834 A1* | 12/2011 | Nielsen et al. ............... 60/780 |

OTHER PUBLICATIONS

B. Metz, "IPPC Special Report on Carbon Dioxide Capture and Storage," Cambridge University Press, XP002595416, Dec. 31, 2005, pp. 131-135.
K.S. Lackner, "A Guide to C02 Sequestration", Science, XP002595501, vol. 300, pp. 1677-1678, Jun. 13, 2003.

* cited by examiner

*Primary Examiner* — Jafar Parsa
(74) *Attorney, Agent, or Firm* — Dickstein Shapiro LLP

(57) ABSTRACT

A process for the preparation of hydrocarbon products comprising the steps of (a) providing a synthesis gas comprising hydrogen, carbon monoxide and carbon dioxide; (b) reacting the synthesis gas to an oxygenate mixture comprising methanol and dimethyl ether in presence of one or more catalysts which together catalyse a reaction of hydrogen and carbon monoxide to oxygenates at a pressure of at least 4 MPa; (c) withdrawing from step (b) the oxygenate mixture comprising amounts of methanol, dimethyl ether, carbon dioxide and water together with unreacted synthesis gas and introducing the entire amount of the oxygenate mixture without further treatment into a catalytic oxygenate conversion step (d); (d) reacting the oxygenate mixture in presence of a catalyst being active in the conversion of oxygenates to higher hydrocarbons; (e) withdrawing an effluent from step (d) and separating the effluent into a tail gas, a liquid hydrocarbon phase containing the higher hydrocarbons produced in step. (d) and a liquid aqueous phase, wherein the pressure employed in steps (c) to (e) is substantially the same as employed in step (b).

7 Claims, 2 Drawing Sheets

Fig. 1. Oxygenate (Methanol/DME) synthesis: H2+CO equilibrium conversion curve. Temperature: 240°C; synthesis gas composition (mole-%): $H_2/CO/CO_2/CH_4 = 47/45/4/4$.

PROCESS FOR THE PREPARATION OF HYDROCARBONS FROM SYNTHESIS GAS

This invention relates to a process for the production of hydrocarbons, especially gasoline.

In particular, the invention concerns a combination of process steps for the production of gasoline compounds from synthesis gas, wherein carbon dioxide being present in the synthesis gas and being formed during the process is separated from the final liquid gasoline compounds.

The synthetic gasoline process is known to take place in two steps: the conversion of synthesis gas to oxygenates and the conversion of oxygenates to gasoline product. These process steps may either be integrated, producing an oxygenate intermediate, e.g., methanol or methanol dimethyl ether mixtures, which along with unconverted synthesis gas is passed in its entirety to the subsequent step for conversion into gasoline or the process may be conducted in two separate steps with intermediate separation of oxygenates, e.g. methanol or raw methanol.

Useful oxygenates include methanol, dimethyl ether and higher alcohols and ethers thereof, but also oxygenates like ketones, aldehydes and other oxygenates may be applied.

In either case conversion of synthesis gas to oxygenates involves heat development in that both the conversion of synthesis gas to oxygenate and the further conversion of oxygenate to gasoline product are exothermic processes. The production of gasoline by the integrated process scheme is also discussed in U.S. Pat. No. 4,481,305. Hydrocarbons and especially as gasoline are prepared by catalytic conversion in two subsequent reactors of a synthesis gas containing hydrogen and carbon oxides and having a mole ratio $CO/H_2$ above 1 and when the conversion commences a mole ratio $CO/CO_2$ of 5 to 20. Synthesis gas is converted with high efficiency in a first step into an oxygenate intermediate comprising predominantly dimethyl ether (DME) said mixture being converted in a second step into gasoline by the net reaction scheme

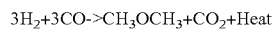  (1)

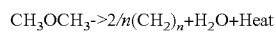  (2)

$(CH_2)_n$ represents the wide range of hydrocarbons produced in the gasoline synthesis step. After separation of the hydrocarbon product, unconverted synthesis gas comprising hydrogen and carbon oxides is recycled to the oxygenate synthesis step after $CO_2$ is at least partly removed, e.g. in a $CO_2$ wash.

The general object of the invention is to provide an improved integrated process scheme for the preparation of valuable hydrocarbons, boiling in the gasoline rang from carbon monoxide rich synthesis gas, an intermediate oxygenate synthesis and a gasoline synthesis, without recycle of unconverted synthesis gas to the oxygenate synthesis and without removal of carbon dioxide from the intermediate oxygenate synthesis product upstream the oxygenate and gasoline synthesis.

The invention is based on the finding that when operating the oxygenate synthesis at high pressure the conversion of the synthesis gas to oxygenate is almost complete and on the further observation that larger amounts of carbon dioxide have no detrimental effect on the reaction of oxygenates to higher hydrocarbons.

The invention provides in its broadest embodiment a process for the preparation of hydrocarbon products comprising the steps of (a) providing a synthesis gas comprising hydrogen, carbon monoxide and carbon dioxide;
(b) reacting the synthesis gas to an oxygenate mixture comprising methanol and dimethyl ether in presence of one or more catalysts which together catalyse a reaction of hydrogen and carbon monoxide to oxygenates at a pressure of at least 4 MPa;
(c) withdrawing from step (b) the oxygenate mixture comprising amounts of methanol, dimethyl ether, carbon dioxide and water together with unreacted synthesis gas and introducing the entire amount of the oxygenate mixture without further treatment into a catalytic oxygenate conversion step (d);
(d) reacting the oxygenate mixture in presence of a catalyst being active in the conversion of oxygenates to higher hydrocarbons;
(e) separating the effluent of step (d) into a tail gas, a liquid hydrocarbon phase and a liquid aqueous phase, wherein the pressure employed in steps (c) to (e) is substantially the same as employed in step (b).

Synthesis gas being useful for the invention is preferably adjusted to a $H_2/CO$ ratio of about 1, and is reacted in presence of an oxygenate catalyst including the known methanol catalysts e.g. catalysts with copper, zinc and aluminium oxide combined with a dehydrogenation catalyst comprising a solid acid such as a zeolite, alumina or silica-alumina.

At such CO-rich conditions the water gas shift reaction induces a strong enhancement of conversion due to favourable thermodynamics because water formed in the oxygenate production step is shifted virtually completely by reaction with CO to form hydrogen and carbon dioxide. The net reaction then becomes essentially that of hydrogen+carbon monoxide to $DME+CO_2$. High conversion levels may be obtained under such conditions, even when appreciable amounts of CO2 is present in the synthesis gas. FIG. 1 shows synthesis gas equilibrium conversion levels, defined as $$((H_2+CO)exit/(H_2+CO)inlet) \times 100\%$$

over an oxygenate synthesis catalyst active in MeOH and DME and water gas shift syntheses. It is observed from FIG. 1 that a theoretical conversion of more than 90% may be achieved at 7 Mpa. At 13 MPa more than 90% conversion may be realised. At 7 MPa more than 80% conversion may be realised and even at 4 MPa synthesis pressure 75% conversion may be obtained.

Consequently, when operating the oxygenate synthesis step at a pressure of above 4 MPa in accordance with the invention, recycle of unconverted synthesis gas is advantageously avoided.

The preferred pressure range for use in the oxygenate synthesis is between 4 and 13 MPa.

The entire effluent withdrawn from the oxygenate synthesis step, comprising mainly dimethyl ether and carbon dioxide together with minor amounts of methanol, hydrogen and carbon monoxide is then introduced into the subsequent gasoline synthesis.

The gasoline synthesis is performed at substantially the same pressure as employed in the previous oxygenate synthesis in the presence of a catalyst being active in the reaction of oxygenates to higher hydrocarbons, preferably $C_{5+}$ hydrocarbons. A preferred catalyst for this reaction is the known zeolite H-ZSM-5.

The reaction of dimethyl ether to higher hydrocarbons is known to be strongly exothermic and needs either indirect cooling (e.g. boiling water or fluidised bed reactor) or dilution of the reacting gas (e.g. fixed-bed adiabatic reactor) with an inert gas or the reaction product in order to control the reaction temperature.

In an embodiment of the process according to the invention the effluent from the oxygenate synthesis is diluted with an inert gas comprising mainly carbon dioxide being recycled to the gasoline synthesis from a downstream product separation step.

The carbon dioxide contained in the recycle gas originates from unconverted synthesis gas and is formed as by-product during synthesis of dimethyl ether and gasoline.

As further an advantage of the invention, the content of carbon dioxide having a high heat capacity ($C_p$=48 J/K/mole) acts as a heat sink being favourable in the exothermic gasoline reaction, resulting in a reduced amount of recycle compared to known oxygenate to gasoline processes.

The reaction effluent from the gasoline reactor contains hydrocarbons in the range from C1 to C11, water and carbon dioxide and residual amounts of unconverted $H_2$, CO and inerts.

By cooling and condensation a first liquid phase with water, a second liquid hydrocarbon phase of mixed gasoline and LPG is obtained, referred to as raw gasoline and is separated from a gaseous phase containing the carbon dioxide originating from the synthesis gas and being formed in the upstream processes as described above. The raw gasoline may be further processed by conventional means to obtain a lower-boiling gasoline fraction and a fraction of light petroleum gas (LPG).

As already mentioned herein above, a part of the carbon dioxide containing gaseous phase may be recycled to the gasoline synthesis for temperature control.

The amount of recycle gas is adjusted to provide an oxygenate (MeOH+DME) concentration inlet of the gasoline reactor between 2 and 10% by volume.

The process according to the invention does advantageously not require any separate upstream or intermediate carbon dioxide removal.

Still an advantage of the invention is that the amount of $CO_2$ being present in the synthesis gas feed stream and the amount of $CO_2$ being produced in the synthesis step may be recovered downstream the gasoline synthesis at essentially the synthesis pressure prevailing in the oxygenate synthesis step. This stream, apart from being rich in $CO_2$, contains inerts such as $N_2$ and Ar and also combustible compounds in appreciable amounts: unconverted $H_2$ and CO as well as uncondensed, primarily light, hydrocarbons and, therefore, represents a significant calorific value.

Therefore, the part of the $CO_2$-rich gaseous phase which is not recycled to the gasoline synthesis may advantageously be combusted thus providing source for producing electrical power. Oxidant for the combustion may be air, preferably oxygen-enriched air or, more preferably oxygen itself: The use of pure or almost pure oxygen as oxidant will produce a resulting stream of essentially pure $CO_2$ containing minor amounts of incombustible inerts such as nitrogen and argon. The pressure of this resulting stream of essentially pure $CO_2$ will be essentially that of the oxygenate synthesis pressure.

Sequestration of carbon dioxide by injection at high pressure into underground geological formations serve to mitigate the accumulation of greenhouse gases in the atmosphere. Sequestration is practiced in many places, e.g. in Beulah, N. Dak., hosting the world's first coal using plant to capture and store carbon dioxide by sequestration. Another example is the Sleipner gas field in the North Sea, where carbon dioxide is stripped from natural gas with amine solvents and disposed of in a deep saline aquifer.

The recovery of $CO_2$ at elevated pressure according to the invention represents a significant advantage, because it enables a more economic way for sequestration of $CO_2$ than processes using conventional methods such as absorption by liquid $CO_2$ absorption processes like, e.g. Rectisol, Selexol, or amine solutions, e.g. MDEA. Besides being expensive in terms of capital cost and operation these recovery processes typically reject $CO_2$ at close to atmospheric pressure, requiring several compression stages in order to reach sufficient pressure of 130 bar or similar required for sequestration.

Thus, the present invention makes the purified $CO_2$ available at elevated pressure without requiring any of the aforementioned technologies for upstream $CO_2$ removal simply by post-combustion of the off-gas from the gasoline synthesis.

BRIEF DESCRIPTION OF THE DRAWINGS

The above disclosed features and aspects of the present invention will be explained in more detail in the following examples 1 and 2 by reference to the following drawings, in which.

DETAILED DESCRIPTION AND EXAMPLES OF THE INVENTION

EXAMPLE 1

A tubular reactor having an internal diameter of 19 mm was charged with a physical mixture of 49 g of a commercial methanol synthesis catalyst, available from Haldor Topsøe A/S under the trade name MK-131 and 21 g of commercial DME synthesis catalyst available from Haldor Topsøe A/S under the trade name DMK-10. The catalyst was reduced for 2 hours at 190° C. and 1.0 MPa in a flow (10 Nl/h) of 2% H2 in N2. The reactor was then fed with synthesis gas, having the composition 1 of Table 1 (Ar, listed in Table 1 as N2/Ar, was used as an internal standard) at a rate of 100 Nl/h and the pressure was subsequently increased to 8.8 MPa. When stable operating conditions were achieved the reactor effluent was analyzed online by gas chromatography, showing the composition 2 in Table 1.

EXAMPLE 2

Figure 1:
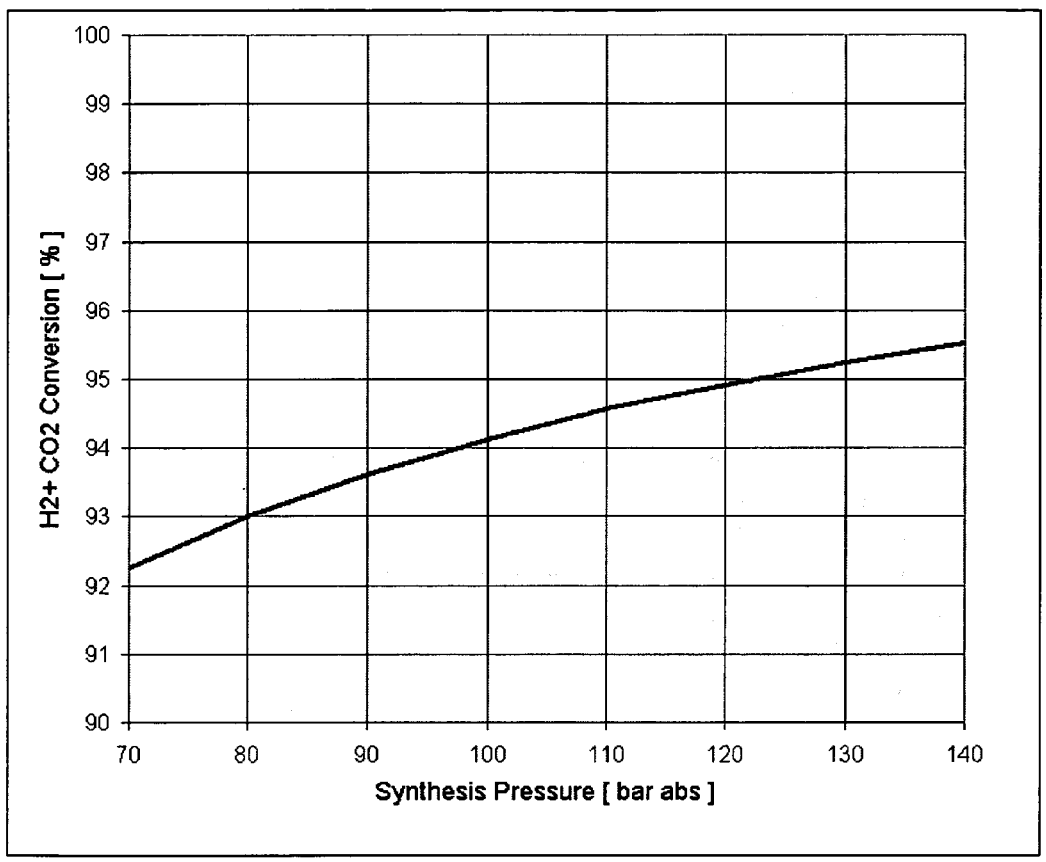
FIG. 1 is an oxygenate synthesis to H2+CO equilibrium conversion curve and in FIG. 2, which shows a flow scheme of a specific embodiment of the invention.
Figure 2:
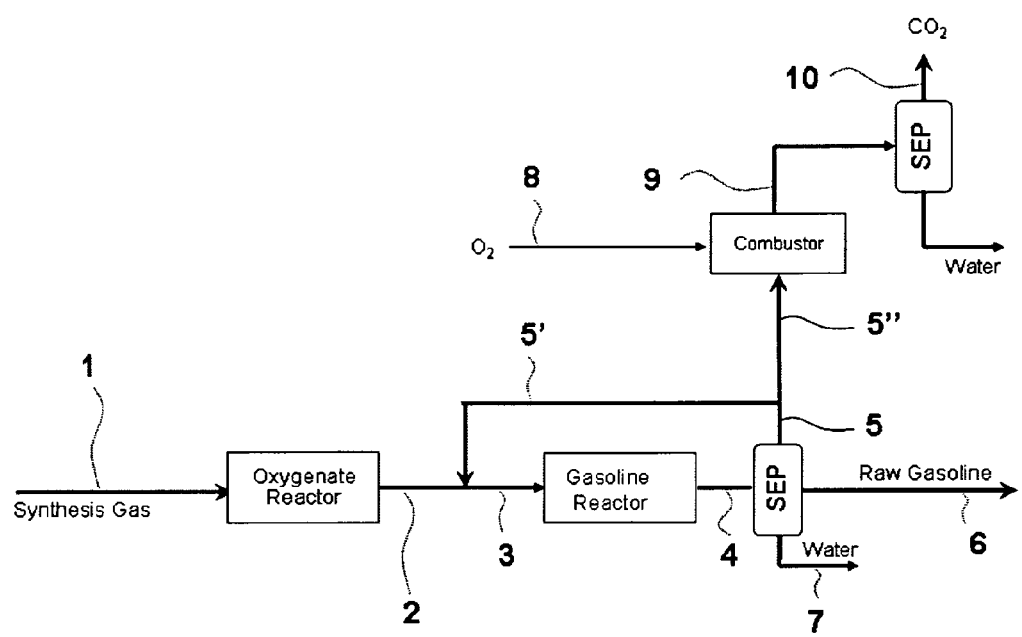

Referring now to FIG. 2 and Table 1 below, a synthesis gas with the composition according to reference number 1 in Table 1 is fed to a boiling water oxygenate reactor at a pressure of 8.8 MPa to produce a reaction mixture 2 rich in DME and $CO_2$ at an exit temperature of 260° C. The effluent from the oxygenate reactor is mixed with a recycle stream 5', forming the stream 3, and is passed to the gasoline reactor at 350° C. Exiting the gasoline reactor at approx. 400 C, stream 4 is cooled to 5° C., causing the effluent to separate into a gaseous phase 5, rich in $CO_2$, a liquid phase 6 of raw gasoline and a liquid phase 7 of water. Part of the gaseous phase 5, 5', is recycled to the gasoline reactor in order to dilute the oxygenate feed concentration at the gasoline reactor inlet, thus serving as a means of reducing the exothermicity of the gasoline reactor. The remaining part of the gaseous phase 5, 5", is combusted with oxygen 8 in the combustor to produce heat and electric power resulting in a waste stream 9 of >99% $CO_2$ at a pressure of 8.3 MPa.

TABLE 1

| (Mole %) | 1 | 2 | 3 | 4 | 5 | 6 | 9 | 10 |
|---|---|---|---|---|---|---|---|---|
| $H_2$ | 45.7 | 17.5 | 25.6 | 25.4 | 26.5 | | | |
| $H_2O$ | 2 | 1.4 | 0.1 | 2.7 | | | 37.4 | |
| CO | 43.1 | 9.4 | 14.1 | 14.0 | 14.6 | | | |
| $CO_2$ | 7.5 | 41.9 | 50.2 | 49.7 | 51.2 | 2.1 | 62.3 | 99.6 |
| $N_2$/Ar | 0.14 | 0.28 | 0.4 | 0.4 | 0.4 | | 0.2 | 0.4 |
| MeOH | | 2.5 | 0.3 | | | | | |
| DME | | 24.1 | 2.4 | | | | | |
| C1 – C2 | 1.5 | 3.0 | 5.1 | 5.2 | 5.3 | | | |
| C3 – C4– | | | 1.3 | 1.3 | 1.6 | 9.4 | | |
| C5+ | | | 0.4 | 1.4 | 0.5 | 88.5 | | |
| $Nm^3$/h | 1025 | 509 | 5068 | 5120 | 4905 | 28 | 571 | 357 |
| Kg/h | | | | | | 114 | | |

The Example demonstrates that a synthesis gas containing a significant amount of $CO_2$ may be converted into fuel-grade hydrocarbons, such as gasoline and LPG, with high efficiency without prior removal of $CO_2$. At the same time this example demonstrates that essentially all of the $CO_2$ originally present in the synthesis gas as well as the $CO_2$ formed in the oxygenate synthesis may be recovered at high pressure, similar to the synthesis pressure except for parasitic losses due to pressure drop etc. Being recovered at elevated pressure the $CO_2$ is useful for sequestration as opposed to known processes for $CO_2$ capture in which the $CO_2$ is released at much lower pressure, usually close to atmospheric pressure, requiring several steps of compression in-order to be sequestered.

The invention claimed is:

1. A process for the preparation of hydrocarbon products comprising the steps of:
    (a) providing a synthesis gas comprising hydrogen, carbon monoxide and carbon dioxide;
    (b) reacting the synthesis gas to an oxygenate mixture comprising methanol and dimethyl ether in presence of one or more catalysts which together catalyze a reaction of hydrogen and carbon monoxide to oxygenates at a pressure above 4 MPa;
    (c) withdrawing from step (b) the oxygenate mixture comprising amounts of methanol, dimethyl ether, carbon dioxide and water together with unreacted synthesis gas and introducing the entire amount of the oxygenate mixture without further treatment into a catalytic oxygenate conversion step (d);
    (d) reacting the oxygenate mixture in presence of a catalyst being active in the conversion of oxygenates to higher hydrocarbons; and
    (e) withdrawing an effluent from step (d) and separating the effluent into a tail gas, a liquid hydrocarbon phase containing the higher hydrocarbons produced in step (d) and a liquid aqueous phase, wherein the pressure employed in steps (c) to (e) is substantially the same as employed in step (b), and wherein the oxygenate mixture is diluted with an inert gas comprising mainly carbon dioxide contained in the synthesis gas and formed during reaction of the synthesis gas to dimethyl ether, the carbon dioxide beign recycled to step (d) from a downstream product separation step.

2. The process according to claim 1, wherein part of the tail gas remaining from step (e) is combusted to a combustion gas containing $CO_2$.

3. The process according to claim 2, wherein part of the tail gas remaining from step (e) is combusted with oxygen to produce power and to provide a stream of $CO_2$ at elevated pressure.

4. The process according to claim 2, wherein the $CO_2$ is eventually sequestered.

5. The process of claim 1, wherein the pressure in step (b) is between 4 and 13 MPa.

6. The process of claim 1, wherein the liquid hydrocarbon phase comprises raw gasoline.

7. The process according to claim 1, wherein a part of the tail gas obtained in step (e) is recycled to step (d).

\* \* \* \* \*